United States Patent [19]
Cannone

[11] Patent Number: 5,258,243
[45] Date of Patent: Nov. 2, 1993

[54] PRESSURE RELIEF VALVE FOR RECOMBINANT BATTERY

[75] Inventor: Anthony G. Cannone, Cranford, N.J.

[73] Assignee: AT&T Bell Laboratories, Murray Hill, N.J.

[21] Appl. No.: 998,079

[22] Filed: Dec. 29, 1992

[51] Int. Cl.⁵ ............................................. H01M 2/12
[52] U.S. Cl. ......................................... 429/55; 429/54
[58] Field of Search .............................. 429/55, 54, 53

[56] References Cited

U.S. PATENT DOCUMENTS

| | | |
|---|---|---|
| 4,078,121 | 3/1978 | Gratzmuller . |
| 4,294,895 | 10/1981 | Atkins ............................. 429/54 X |
| 4,328,290 | 5/1982 | Szymborski et al. . |
| 4,588,663 | 5/1986 | Mason et al. ......................... 429/54 |
| 4,756,982 | 7/1988 | McCartney et al. . |
| 4,780,378 | 10/1988 | McCartney et al. . |
| 5,108,853 | 4/1992 | Feres . |

OTHER PUBLICATIONS

Diagram-Vent Design (prior art), Nov., 1991.
"Performance Evaluation of Recombinant Lead-Acid Battery Valves" by S. R. Camp, Contel Laboratories, pp. 21-23, Nov., 1990.

Primary Examiner—John S. Maples
Attorney, Agent, or Firm—Alfred G. Steinmetz

[57] ABSTRACT

A pressure relief valve, according to the invention, is mounted on a vent orifice providing a gas passageway from an interior plenum of a battery or a cell thereof to the ambient atmosphere. The valve fits on the vent orifice and opens to release gas at a high threshold battery gas pressure and reseals the vent orifice when the internal pressure of the battery drops to a low threshold.

15 Claims, 1 Drawing Sheet

PRESSURE RELIEF VALVE FOR RECOMBINANT BATTERY

FIELD OF THE INVENTION

This invention relates to a recombinant battery and in particular to a pressure relief valve for a recombinant lead acid battery.

BACKGROUND OF THE INVENTION

Proper operation of a recombinant (valve regulated) sealed lead acid battery, is highly dependent on regulating the proper internal gas pressure within the battery container. A pressure relief valve is an important component to maintain this proper gas pressure. A properly functioning pressure relief valve regulates the gas pressure by releasing gas from the battery container through a vent, coupling the internal battery plenum to the ambient atmosphere, when a high internal threshold pressure is reached, and resealing the vent when the internal pressure drops to a second low threshold pressure. Failure of the pressure relief valve may cause catastrophic failure of the battery due to excessive loss of the battery fluid at an undersirable low pressure or an explosion due to excess gas pressure, depending upon the nature of the performance failure of the pressure relief valve. A properly operating relief valve should accurately release and reseal in its every expected position in which the cell battery operates in response to the high and low pressure thresholds.

Pressure relief valves are often constructed of a resilient hard rubber. Venting action by the pressure relief valve depends upon the valve having a pressure responsive movement, such as the flaring of a skirt member of the valve, in response to pressure above some high pressure threshold and an ability to reseal below at another lower pressure threshold. Such a pressure relief valve construction is disclosed in the U.S. Pat. No. 4,780,378. At high pressure the skirt member of the valve flares outwardly to prevent the build up of internal pressure in the battery, but as the pressure drops the skirt member is relaxed and returns to a sealed condition.

The movement of the valve can cause the valve to move in a manner which causes it to improperly reseat following pressure reduction after a pressure relief operation. The valve mechanism in such a case ceases to function at the designated release and reseal gas pressures. In some designs resealing may fail to occur altogether. The valve is normally constrained to remain in an operative position by elaborative mechanical structure such as disclosed in U.S. Pat. No. 4,780,378. This structural arrangement is typically expensive.

SUMMARY OF THE INVENTION

A pressure relief valve, according to the invention, is mounted atop a vent tube orifice providing a gas passageway from an interior plenum of a battery to the ambient atmosphere. The valve fits over the vent orifice and opens to release gas at a high threshold battery gas pressure and properly reseats to reseal vent orifice when the internal pressure of the battery drops to a low threshold.

The venting orifice includes a vent tube included in a venting chamber. The venting tube is capped by the relief valve which seals the vent by means of a skirt member of the relief valve which includes an internal annular rib that fits circumferentially about the outer surface of the vent tube. The base portion of the skirt member is dimensioned, relieved and contoured to control the flexing of the skirt member to respond to specific gas pressure thresholds for opening and closing access of the ambient atmosphere to the venting orifice of the vent tube by radially flaring with respect to the outside surface of the vent tube and providing ambient access past the annular rib. The pressure relief valve structure has an internal location controlling shallow flat surfaced convex protrusion which fits into the inside orifice of the valve stem to insure its proper reseating. An annular relief about its periphery insures proper reseating. It is operative to allow a clear gas way passage while also maintaining a positive location restraint for the relief valve. The shallow dimension is selected so that the flat surface of the protrusion clears the end of the vent tube during pressure release.

The performance of the pressure relief valve is further enhanced by the annular rib which operates as a pseudo "O" ring molded in place on the interior surface of the skirt member and which enables the maintenance of a precisely located sealing line with respect to the vent stem. The pressure relief valve structure has an internal location controlling shallow flat surfaced convex protrusion which fits into the inside orifice of the valve stem. It is operative to allow a clear gas way passage while also maintaining a positive location restraint for the relief valve.

Acid from the gasses during pressure relief collect on the annular rib and advantageously acts as a lubricant for the pressure relief valve enhancing its operation. The annular rib is also located sufficiently above the bottom edge of the skirt member end so as to effectively prevent ambient contaminant particles from adhering to the lubricated rib.

DETAILED DESCRIPTION

Figure 1:
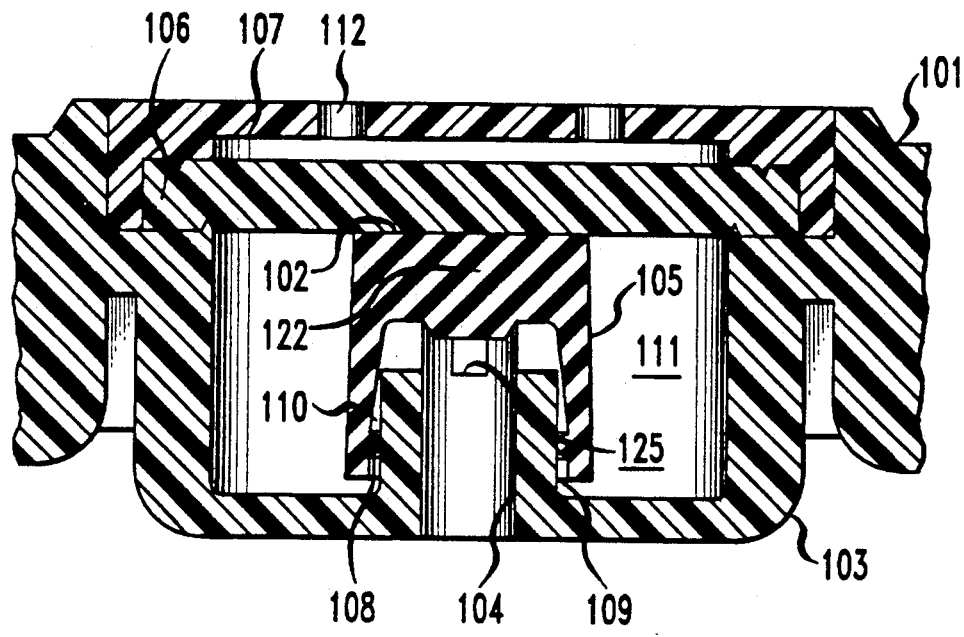
FIG. 1 is a cross section schematic of a venting mechanism for a battery including a pressure relief valve.

The outer cover 101 of the battery casing has a cavity member 103 moulded therein for providing support for a tube gas vent 104 and a pressure relief valve 105. The vent 104 is a tube notched at the end with notches 125 occuring at 90° intervals. A flame arrester member 106 is seated atop the pressure relief valve 105 and a vent cap 107 with gas venting holes is positioned above the flame arrester 106. A compressive force is applied by the flame arrester 106 to the top surface 102 of the pressure relief valve 105. This compressive force applied by the flame arrester member 106 to the top surface allows the operation of the pressure relief valve while preventing it from rising up on the vent tube 104. A compressive force is generated by pressure applied to the crown portion 122 and is supplied by the flame arrester member 106. The dimensional distance between the top of the vent tube 104 and the bottom surface of the flame arrester is selected in accord with the dimension 123 (FIG. 2) of the crown 122 to generate this compressive force. While this is described in terms of a flame arrester, it is to be understood that members other than flame arresters may be used to supply this compression.

The inner surface of a skirt member 110 of the relief valve 105 includes an annular rib 108 that is physically contiguous to the outer surface 109 of the tube gas vent 104. As the skirt member of the is subjected to a gas pressure from within the battery container equaling and exceeding a high pressure threshold the skirt member distends or flares outwardly so that the annular rib 108 ceases to contact the vent's outer surface 109 and gas is allowed to vent from the battery plenum to the outside ambient atmosphere. The passageway for this exiting gas is through the orifice of the vent tube orifice 104; along the outer surface 109; past the annular rib 108; into the plenum chamber 111 of the cavity member 103 and through the flame arrester and the openings 112 of the vent cap 107. The annular rib 108 combines the effectiveness of an "O" ring and a rubber memory force in sealing the space between the rib and the outer surface of the vent tube. The rib 108 being affixed to the skirt member 110 maintains a defined continuous tangential sealing line with respect to the vent tube.

Figure 2:
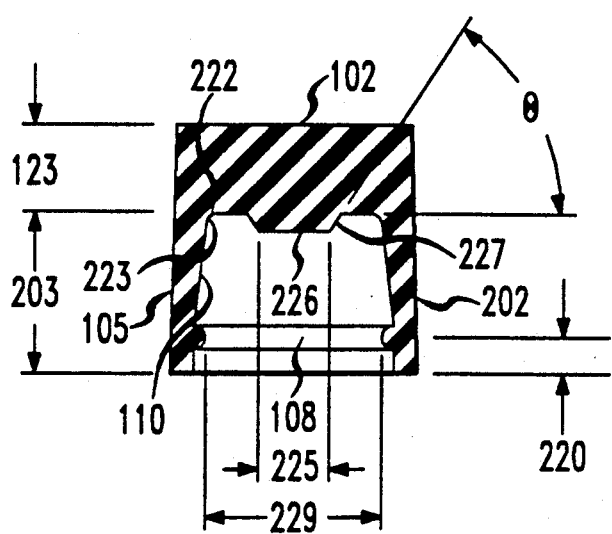
FIG. 2 is a cross section schematic of the pressure relief valve.
Figure 3:
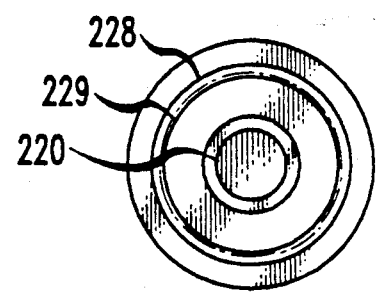
FIG. 3 is a plan view of the pressure relief valve of FIG. 2.

The pressure relief valve 105 shown in FIGS. 2 and 3 has an outer cylindrical shape with a substantially flat top surface 102 and a cylindrical outer surface 202. The cylindrical portion covered by the linear dimension range 203 forms the skirt member 110 of the valve. This linear dimension is controlled by the size of the battery cell and the expected volume of gas being generated. The internal structure of the pressure relief valve includes the annular rib 108 located on the interior portion of the skirt member 110 having its center at a distance 220 from the bottom of the skirt member. The annular rib 108 has an internal diameter shown by dimension 229. The annular rib 108 contacts the valve stem tangentially and functions much like an "O" ring and is permanently structurally positioned from an end edge of the skirt member by being an integral portion of the skirt member. An annular groove, relief or undercut 222, defining a central location controlling protrusion 226 in the internal base of the pressure relief valve, is asymmetrically proportioned to fit conformably over the notched circumferential end of the vent tube. The flat surface and shallowness of the protrusion 226 advantageously permits free operation of the relief valve in venting gas and prevents mechanical shifting of the valve relative to the vent tube during reseating of the annular rib 108.

The annular relief 222 of the pressure relief valve 105 has a dimensioned radius 223 and an inner circumferential tapered slope 227 angled at an angle of $\theta$ degrees with the horizontal. The dimensioned radius is connected to the skirt member 110 and the tapered slope 227 is connected to the protrusion 226. The flat surface of protrusion 226, with the diameter shown by dimension 225 forms the inner central base surface of the valve. It has a dimension height 227 above the bottom of the annular relief 222. The internal portion of the valve has a diameter shown by the dimension 228. The material characteristics, shapes and dimensions, such as the annular relief and protrusion dimensions and the thickness and length of the skirt member, are selected to accommodate proper gas gating performance at specific high and low threshold pressures in a predefined operating environment. The chief function of the protrusion 226 is to control the relief valve position during gas venting and further cause to prevent shifting of the valve on the orifice following temination of gas venting action.

The valve is preferably constructed from a soft chlorobutyl/EPDM rubber with a durometer range of 25 to 70. In a particular illustrative embodiment constructed of such a material, the durometer is 30 and the following dimensions have been adhered to for a forty-eight volt multi-cell recombinant battery.

$\theta$ = 30 degrees
Radius 223 = 0.030"
Length 203 = 0.177"
Length 220 = 0.051"
Length 227 = 0.024"
Diameter 225 = 0.153"
Diameter 229 = 0.296"
Diameter 202 = 0.464"

These dimensions are intended to be illustrative only to assist those skilled in the art in designing a pressure relief valve with the proper response characteristics and are not intended to be limiting.

I claim:

1. A gas pressure venting mechanism for a battery, comprising:
   a cavity in an outer casing of the battery including;
   a vent tube interconnecting a gaseous internal cavity of the battery with ambient atmosphere;
   a pressure relief valve including;
   a supporting member forming a top portion of the pressure relief valve;
   a skirt member supported from the supporting member and positioned for surrounding an outer surface of the vent tube;
   an annular rib moulded onto an internal surface of the skirt member and operative as an "O" ring in sealing the vent tube from ambient atmosphere along a tangential sealing line;
   a shallow circular protrusion included internal to the skirt member having a substantially planar surface and molded into the supporting member and operative for inserting into the vent tube orifice for maintaining a position of the pressure relief valve relative to an orifice of the vent tube.

2. A gas pressure venting mechanism for a battery, as claimed in claim 1, comprising:
   the cavity in the outer casing including a flame arester located above the pressure relief valve securing the pressure relief valve o a top edge at the orifice of the vent tube while allowing release of gas pressure and further prevent the pressure relief valve from shifting relative to the vent tube.

3. A gas pressure venting mechanism for a battery, as claimed in claim 1, comprising:
   a annular relief circumscribing the shallow circular protrusion and receiving the circumferential end of the valve tube.

4. A gas pressure venting mechanism for a battery, as claimed in claim 3, comprising:
   wherein the annular relief surrounding the circular protrusion has a shallow height dimension to the planar surface of the protrusion allowing the substantially planar surface of the protrusion to maintain a position of the valve relative to the vent tube during pressure release.

5. A gas pressure venting mechanism for a battery, as claimed in claim 3, comprising:
   the annular relief having a cross sectional profile comprising a fixed linear slope section adjacent the periphery of the shallow circular protrusion and a circular radiused section adjacent the skirt member with the linear slope section and radiused section being joined to form the full cross section.

6. A gas pressure relief system for a recombinant battery, comprising:
   a venting chamber comprising a cavity molded within a casing of the battery;
   a vent tube having a notched outlet end within the venting chamber and having another end penetrating into an interior plenum of the battery;
   a relief valve constructed as a rubber molding for caping the outlet of the vent tube; the relief valve comprising:
   a top member and a skirt member;
   the top member comprising, an external planar surface and an internal valve location controlling convex protrusion with a substantially planar surface for extending into the vent tube and surrounded by an annular undercut fitted over the end of the vent tube;
   the skirt member attached to the top member and fitting about an external surface of the vent tube, and further including an annular rib contiguous with the external surface of the vent tube at non-venting pressures;
   whereby gas pressure above a threshold causes the skirt member to flare and extend the annular rib to allow passage of gas between the external surface of the vent tube and the annular rib.

7. A gas pressure relief system for a recombinant battery, as claimed in claim 6 comprising:
   the venting chamber including,
   a flame arrester positioned above the top member for applying a compressive force and preventing unseating of the relief valve from the vent tube.

8. A gas pressure relief system for a recombinant battery, as claimed in claim 7 comprising:
   the venting chamber including,
   a vent cap located above the flame arrester and including venting holes for allowing passage of gasses into the ambient atmosphere.

9. A gas pressure relief system for a recombinant battery, as claimed in claim 8 comprising:
   the relief valve being constructed of a soft chlorobutyl rubber.

10. A gas pressure relief system for a recombinant battery, as claimed in claim 9 comprising:
    the soft chlorobutyl rubber having a durometer value of within a range of 25 to 70.

11. A gas pressure relief system for a recombinant battery, comprising:
    a venting chamber comprising a cavity molded within a casing of the battery;
    a vent tube having an outlet end with a plurality of notches and located within the venting chamber and another end penetrating into an interior plenum of the battery;
    a relief valve constructed as a rubber molding for caping the outlet of the vent tube, the relief valve being constructed of a soft chlorobutyl rubber having a durometer valve of substantially 30;
    the relief valve comprising
    a top member and a skirt member;
    the top member comprising, an external planar surface and an internal valve location controlling convex protrusion with a substantially planar surface for extending into the vent tube and surrounded by an annular undercut fitted over the end of the vent tube;
    the annular undercut having a cross sectional profile comprising a fixed linear slope section adjacent the periphery of the shallow circular protrusion and a circular radiused section adjacent the skirt member with the linear slope section and radiused section being joined to form the full cross section;
    the skirt member attached to the top member and fitting about an external surface of the vent tube, and further including an annular rib contiguous with the external surface of the vent tube at non-venting pressures;
    the venting chamber including, a flame arrester positioned above the top member for engaging the top member with a compressive force and preventing unseating of the relief valve from the vent tube;
    whereby gas pressure above a threshold causes the skirt member to flare and extend the annular rib to allow passage of gas through the notches and between the external surface of the vent tube and the annular rib.

12. A gas pressure relief system for a recombinant battery, as claimed in claim 11 comprising:
    the venting chamber including,
    a vent cap located above the flame arrester and including venting holes for allowing passage of gases into the ambient atmosphere.

13. A gas pressure venting mechanism for a battery, comprising:
    a cavity in the an outer casing of the battery including a vent tube having a notched circumferential end interconnecting a gaseous internal cavity of the battery with ambient atmosphere;
    a pressure relief valve including;
    a supporting member forming a top portion of the pressure relief valve;
    a skirt member supported from the supporting member and positioned for surrounding an outer surface of the vent tube;
    an annular rib moulded onto an internal surface of the skirt member and operative as an "O" ring in sealing the vent tube from ambient atmosphere along a tangential sealing line;
    a shallow circular protrusion included internal to the skirt member having a substantially planar surface having its periphery defined by an an annular relief circumscribing the circular protrusion and receiving the notched circumferential end of the vent tube, and the annular relief having a cross sectional profile comprising a fixed linear slope section adjacent the periphery of the shallow circular protrusion and a circular radiused section adjacent the skirt member with the linear slope section and radiused section being joined to for m the full cross section, and the circular protrusion molded into the supporting member and operative for inserting into the vent tube orifice for maintaining a position of the pressure relief valve relative to an orifice of the vent tube.

14. A gas pressure venting mechanism for a battery, as claimed in claim 13, comprising:
    the cavity in the outer casing including a flame arester located above the pressure relief valve at a distance so as to allow the pressure relief valve to function to release gas pressure and further prevent the pressure relief valve from disconnecting from the vent tube.

15. A gas pressure venting mechanism for a battery, comprising:
- a cavity in the an outer casing of the battery including a vent tube having a circumferential end including an orifice, said tube interconnecting a gaseous internal cavity of the battery with ambient atmosphere;
- a pressure relief valve including;
- a supporting member forming a top portion of the pressure relief valve;
- a skirt member supported from the supporting member and positioned for surrounding an outer surface of the vent tube;
- an annular rib moulded onto an internal surface of the skirt member and operative as an "O" ring in sealing the vent tube from ambient atmosphere along a tangential sealing line;
- a shallow circular protrusion included internal to the skirt member having a substantially planar surface having its periphery defined by an an annular relief circumscribing the circular protrusion and receiving the circumferential end of the vent tube, and the annular relief having a cross sectional profile comprising a fixed linear slope section adjacent the periphery of the shallow circular protrusion and a circular radiused section adjacent the skirt member with the linear slope section and radiused section being joined to form the full cross section, and the circular protrusion molded into the supporting member and operative for inserting into the vent tube orifice for maintaining a position of the pressure relief valve relative to the orifice of the vent tube, and the annular relief surrounding the circular protrusion having a shallow height dimension to the planar surface of the protrusion allowing the substantially planar surface of the protrusion to provide a gas relief path from the internal cavity to the annular rib.

* * * * *